UNITED STATES PATENT OFFICE.

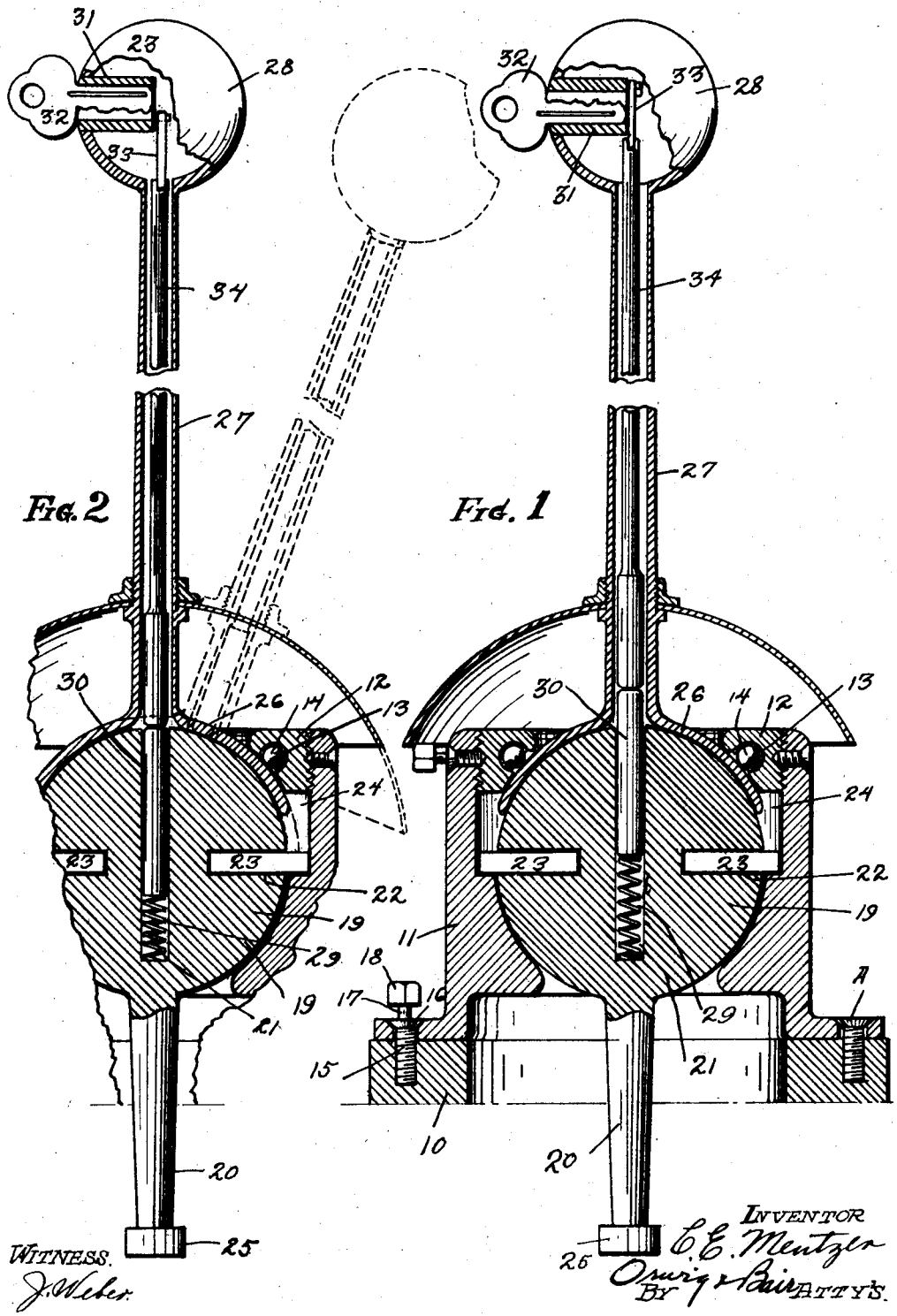

CLAUDE E. MENTZER, OF DES MOINES, IOWA, ASSIGNOR, BY DIRECT AND MESNE ASSIGNMENTS, TO THE ECLIPSE MACHINE COMPANY, OF ELMIRA, NEW YORK, A CORPORATION OF NEW YORK.

LOCKING DEVICE FOR GEAR-SHIFT LEVERS.

1,391,200. Specification of Letters Patent. Patented Sept. 20, 1921.

Application filed October 28, 1919. Serial No. 334,060.

*To all whom it may concern:*

Be it known that I, CLAUDE E. MENTZER, a citizen of the United States, and a resident of Des Moines, in the county of Polk and State of Iowa, have invented a certain new and useful Locking Device for Gear-Shift Levers, of which the following is a specification.

The object of my invention is to provide a locking device for gear shift levers of simple and effective construction, whereby the gear shift lever may be made operative or inoperative, as may be desired.

A further object is to provide a gear shift lever of the type used for shifting gears on modern vehicles, comprising two separate parts having movable members capable of adjustment to position for permitting the operation of one part of the lever through the movement of the other part of the lever and also of adjustment to position whereby the operation of said other part of the lever has no effect on the first lever part.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a vertical sectional view of a locking device for gear shift levers, embodying my invention, the parts being shown in the operative position of the lever.

Fig. 2 shows a similar view with the parts in inoperative position.

In the drawings herewith, I have used the reference numeral 10 to indicate generally the support such as the floor of the car for the casing 11. The casing 11 is provided with a removable plug top member 12, which is screwed into the upper part of the casing, and has formed therein a ball race 13 for ball bearings 14.

The casing 11 is screwed to the support 10 and the plug 12 may be locked in position in the casing 11 by means of what I have called blind stubs, comprising screw-threaded bolts 15 having screw-heads 16, contracted portions 17 and bolt heads 18. The screw-heads have no slots for a screw-driver, and after the screw-threaded bolts are installed, the heads 18 may be knocked off, as illustrated at capital "A," so that the casing can not be removed until a slot can be installed into the heads of the bolts.

Received in the casing is a ball 19, from which projects downwardly the arm 20 for actuating the clutches or gears.

In the ball is a downwardly extending hole 21. In the opposite sides of the ball are round holes 22, which receive pins 23. The pins 23 project laterally into vertically elongated slots 24 in the inner surfaces of the casing 11. The use of the pins 23 holds the head 25 on the arm 20 in proper position.

Resting above the ball 19 and having its outer edge held in position by the balls 14 is a substantially bell-shaped member 26 from which extends upwardly a tubular lever arm 27 on the upper end of which is the ordinary handle ball 28.

In the lower portion of the recess 21 is a coil spring 29 and above the spring is a tumbler 30. Mounted in the ball 28 is a lock, such for instance as the ordinary pin lock, having the escutcheon 31 provided with a hole for receiving the key 32.

Pivoted to the escutcheon 31 is a short link 33, which extends downwardly and is pivoted to an actuating rod 34, the lower end of which abuts against the upper end of the tumbler 30, when the escutcheon is turned by the key to one position of its movement. The actuating rod 34 is moved to its upper limit of movement, and assuming that the lever 27 has been moved until the opening in the lower end thereof registers with the tumbler 30, the upper end of the tumbler will be projected into the lever by means of the spring 29. The gear shift lever may then be used in the ordinary way.

If it is desired to leave the car and to make it safe from being tampered with, the key is turned in the lock for forcing the actuating rod 34 downwardly until said rod is at its lowermost position, as is illustrated in Fig. 2, when the adjacent ends of the rod 34 and tumbler 30 will be alined with the joint between the bell-shaped member 26 and the ball 19. The lever portion 27 may then be swung free, but will have no effect on the ball or arm 20, and will be ineffective for shifting the gears.

The lever member 27 is shown in one of such adjusted positions by dotted lines in Fig. 2.

It will be seen that with my improved lock, it would be impossible for a thief to take the car away under its own power, because the gears could be moved to neutral position before the key was turned to leave the parts as shown in Fig. 2.

The advantages of such a locking device for preventing theft of a car is obvious from the description of the device.

My locking device has numerous advantages, which are to be seen from the description, and has one important advantage over many forms of locks. It will be seen that with a locking device of this kind, the car can be pulled or pushed from where it may be standing in case of fire or the like, and can be steered for moving it around the corners or otherwise, so that it is not locked in such a way, that it must be left where parked until the owner or the possessor of the key is present.

Some changes may be made in the construction and arrangement of the parts of my improved locking device, without departing from the real purpose and spirit of my invention, and it is my intention to cover by my claims any modified forms of structure or use of mechanical equivalents which may be reasonably included within their scope.

The lever 27 is of hardened material, preferably case hardened steel. The rod 34 is of relatively soft iron, so that if the lever should be broken by a sharp blow the tubular member might snap off, but the rod 34 would bend so that it would form a sort of rivet head at the point of the break of the lever.

The rod 34 is unfinished and such a rod is more or less rough and formed with fine corrugations, so that if the lever and rod should be sawed or filed off small particles would slip down into the casing and stick to the rod, so that it could not be raised or lowered.

I claim as my invention:

1. In a device of the class described, a lever member mounted for universal movement, a second lever member adjacent thereto for universal movement, a recess in one of said lever members, a spring actuated tumbler in said recess, the other of said lever members being hollow, a lock controlled actuating arm in the other of said lever members, the parts being so arranged that when the actuating member is in one position of its movement and the recess in the first lever member registers with the hollow end of the other lever member, said tumbler will be projected into the other lever member, whereas when the actuating member is not in this position of its movement, the tumbler and the actuating member will stand with their adjacent ends at the joint between the two lever members, thereby permitting free movement of one lever member with relation to the other.

2. In a device of the class described, a casing, a lever member mounted therein for pivotal movement in two directions, a second lever member rotatably mounted with relation to said casing for universal movement, said last-named lever member having a tubular portion, a lock controlled actuating arm slidably mounted in said portion, a recess in said first lever member, a spring in said recess, a tumbler in said recess adjacent to said spring, said recess being so located with relation to said tubular lever portion that the recess and the tubular lever portion may be brought to registering position or to non-registering position, a screw cover for said casing, and anti-friction devices supported thereby for coacting with said second lever member.

Des Moines, Iowa, September 2, 1919.

CLAUDE E. MENTZER.